(12) United States Patent
Ryu et al.

(10) Patent No.: US 10,349,288 B2
(45) Date of Patent: Jul. 9, 2019

(54) METHOD AND DEVICE FOR RECEIVING FRAME

(71) Applicant: LG ELECTRONICS INC., Seoul (KR)

(72) Inventors: Kiseon Ryu, Seoul (KR); Jeongki Kim, Seoul (KR); Giwon Park, Seoul (KR); Suhwook Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 15/316,138

(22) PCT Filed: Jan. 27, 2015

(86) PCT No.: PCT/KR2015/000833
§ 371 (c)(1),
(2) Date: Dec. 2, 2016

(87) PCT Pub. No.: WO2015/186887
PCT Pub. Date: Dec. 10, 2015

(65) Prior Publication Data
US 2017/0127298 A1    May 4, 2017

Related U.S. Application Data

(60) Provisional application No. 62/006,842, filed on Jun. 2, 2014, provisional application No. 62/014,119, filed (Continued)

(51) Int. Cl.
*H04W 24/02* (2009.01)
*H04L 5/00* (2006.01)
(Continued)

(52) U.S. Cl.
CPC ........... *H04W 24/02* (2013.01); *H04L 5/0023* (2013.01); *H04L 5/0055* (2013.01);
(Continued)

(58) Field of Classification Search
CPC ............. H04W 24/02; H04W 72/1284; H04W 28/0278; H04W 72/0446; H04W 84/12; H04L 5/0055
See application file for complete search history.

(56) References Cited

U.S. PATENT DOCUMENTS

2003/0161340 A1    8/2003  Sherman
2010/0039973 A1    2/2010  Cavalcanti et al.
(Continued)

FOREIGN PATENT DOCUMENTS

JP          200853889 A     3/2008
KR       1020040060964 A    7/2004
(Continued)

OTHER PUBLICATIONS

PCT International Application No. PCT/KR2015/000833, International Search Report dated Apr. 21, 2015, 2 pages.

*Primary Examiner* — Pao Sinkantarakorn
*Assistant Examiner* — Kabir U Jahangir
(74) *Attorney, Agent, or Firm* — Lee Hong Degerman Kang & Waimey

(57) ABSTRACT

A method and device for receiving a frame are disclosed. The method for receiving a frame over a wireless LAN may include: transmitting, by an access point (AP), an uplink transmission scheduling frame to a plurality of stations (STA); receiving, by the AP, a sync PPDU in response to the uplink transmission scheduling frame from each of the plurality of STAs; transmitting, by the AP, an adjustment frame, including adjustment information determined based on the sync PPDU, to the plurality of STAs; receiving, by the
(Continued)

AP, the uplink frame transmitted based on the adjustment information by each of the plurality of STAs over an overlap time resource; and transmitting, by the AP, an ACK frame of the uplink frame to each of the plurality of STAs.

6 Claims, 11 Drawing Sheets

Related U.S. Application Data on Jun. 19, 2014, provisional application No. 62/037,115, filed on Aug. 14, 2014.

(51) Int. Cl.
  *H04W 28/02* (2009.01)
  *H04W 72/12* (2009.01)
  *H04W 72/04* (2009.01)
  *H04W 84/12* (2009.01)

(52) U.S. Cl.
  CPC .......... *H04L 5/0064* (2013.01); *H04L 5/0091* (2013.01); *H04W 28/0278* (2013.01); *H04W 72/1268* (2013.01); *H04W 72/1284* (2013.01); *H04W 72/0446* (2013.01); *H04W 84/12* (2013.01)

(56) References Cited

U.S. PATENT DOCUMENTS

| | | |
|---|---|---|
| 2010/0150082 A1 | 6/2010 | Shin et al. |
| 2014/0376430 A1* | 12/2014 | Su ................. H04W 52/0212 370/311 |
| 2015/0063257 A1* | 3/2015 | Merlin ................ H04L 47/12 370/329 |

FOREIGN PATENT DOCUMENTS

| | | | |
|---|---|---|---|
| KR | 1020100067342 A | | 6/2010 |
| WO | 2013191439 A1 | | 12/2013 |

* cited by examiner

FIG. 1
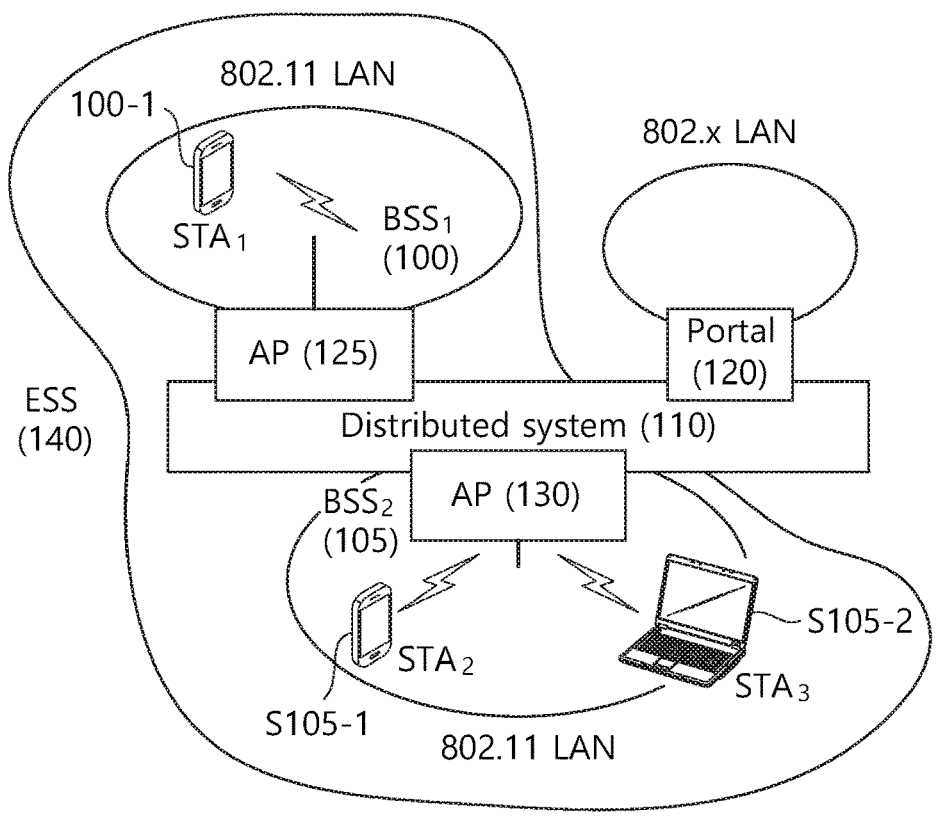
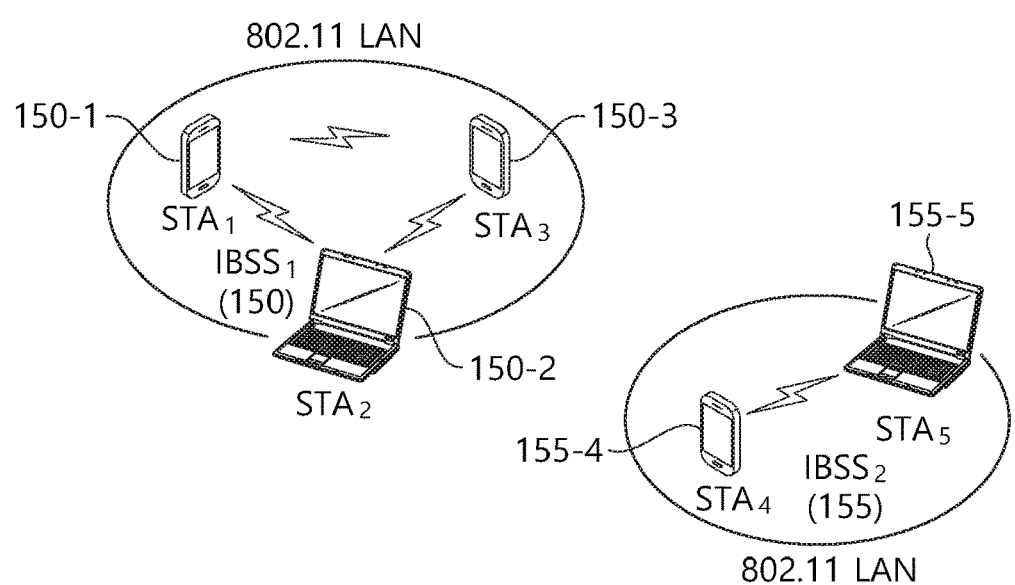

FIG. 8
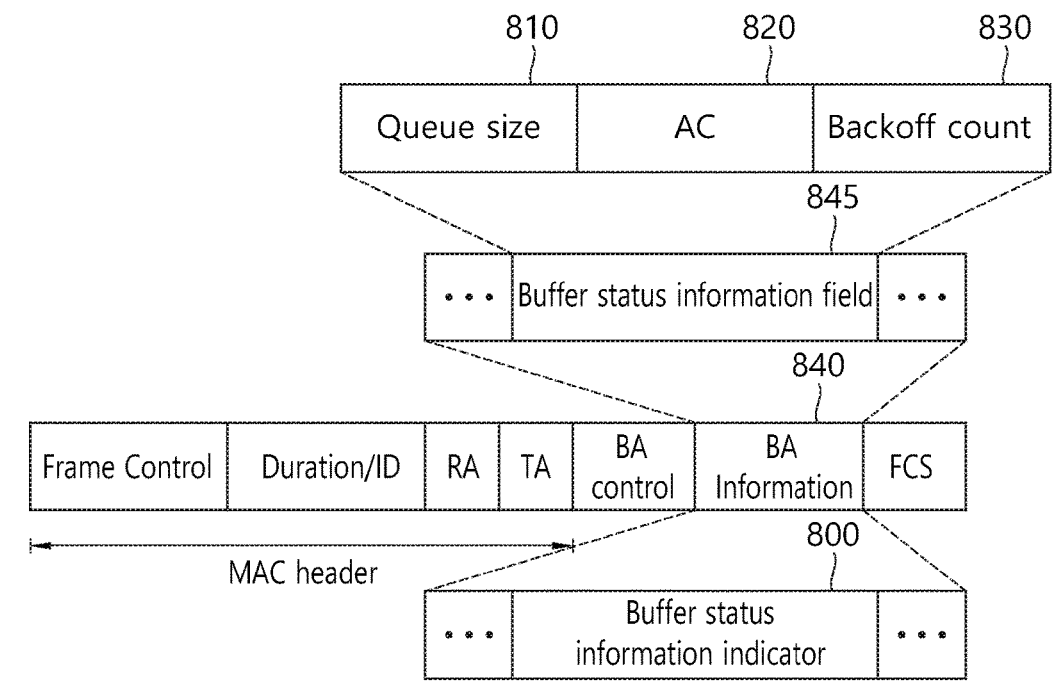
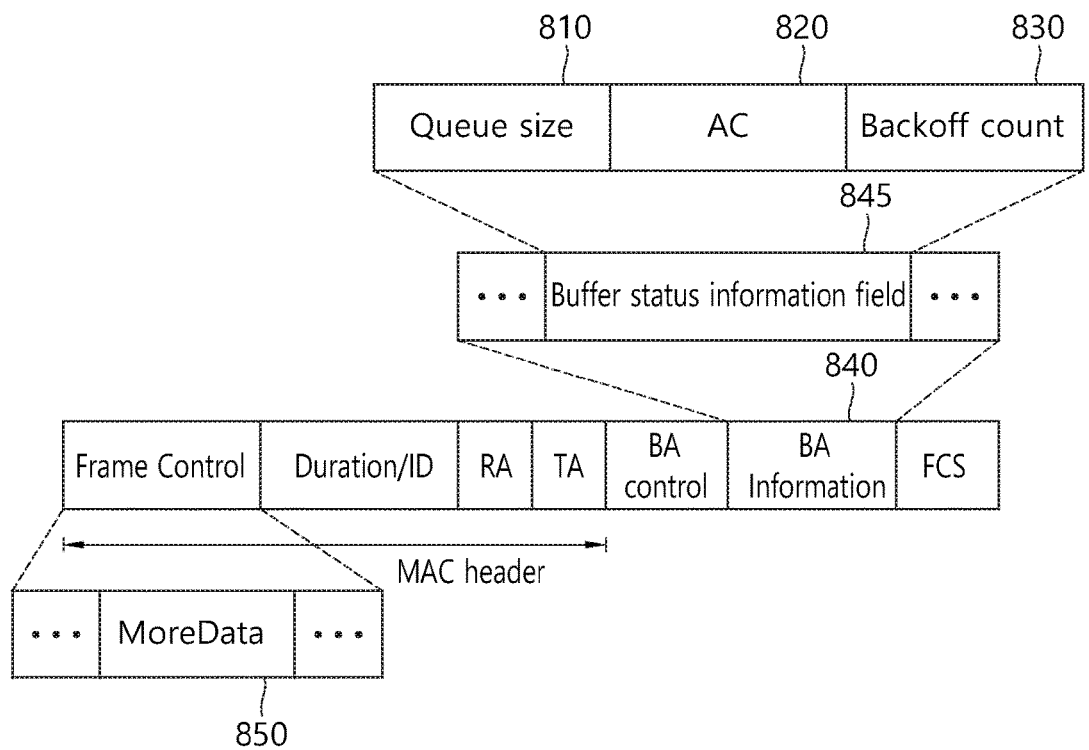

METHOD AND DEVICE FOR RECEIVING FRAME

CROSS-REFERENCE TO RELATED APPLICATIONS

This application is the National Stage filing under 35 U.S.C. 371 of International Application No. PCT/KR2015/000833, filed on Jan. 27, 2015, which claims the benefit of U.S. Provisional Application No. 62/006,842, filed on Jun. 2, 2014, 62/014,119, filed on Jun. 19, 2014 and 62/037,115, filed on Aug. 14, 2014, the contents of which are all hereby incorporated by reference herein in their entirety.

BACKGROUND OF THE INVENTION

Field of the Invention

The present invention relates to wireless communication and, more particularly, to a method and apparatus for receiving a frame.

Related Art

In a wireless local area network (WLAN) system, a distributed coordination function (DCF) may be used as a method enabling a plurality of stations (STAs) to share a wireless medium. The DCF is based on a carrier sensing multiple access with collision avoidance (CSMA/CA).

Generally, in operations under a DCF access environment, when a medium is not occupied (i.e., idle) for a DCF interframe space (DIFS) interval or longer, an STA may transmit a medium access control (MAC) protocol data unit (MPDU) whose transmission is imminent. When the medium is determined to be occupied according to a carrier sensing mechanism, an STA may determine the size of a contention window (CW) using a random backoff algorithm and perform a backoff procedure. The STA may select a random value in the CW to perform the backoff procedure, and may determine a backoff time based on the selected random value.

When a plurality of STAs attempts to access a medium, an STA that belongs to the STAs and has the shortest backoff time is allowed to access the medium and the other STAs may suspend the remaining backoff time and wait until the STA that has accessed the medium terminates its transmission. When the STA that has accessed the medium terminates the frame transmission, the other STAs contend again with the remaining backoff times to obtain a transmission resource. As described above, in the existing WLAN system, one STA occupies all of transmission resources through one channel in order to transmit/receive a frame to/from an AP.

SUMMARY OF THE INVENTION

An object of the present invention is to provide a method for receiving a frame.

Another object of the present invention is to provide an apparatus for receiving a frame.

A method for receiving a frame in a WLAN according to an aspect of the present invention for achieving the object includes the steps of receiving, by an access point (AP), buffer status information from each of a plurality of stations (STAs), determining, by the AP, a plurality of uplink multi-user (UL MU) target STAs of the plurality of STAs and UL MU transmission opportunity (TXOP) based on the buffer status information, sending, by the AP, an UL transmission trigger frame to each of the plurality of UL MU target STAs, and receiving, by the AP, an UL frame on overlapped time resources included in the UL MU TXOP through UL transmission resources allocated to each of the plurality of UL MU target STAs from each of the plurality of UL MU target STAs. The buffer status information may include information about UL data pended in one of the plurality of STAs which has transmitted the buffer status information, and the UL transmission trigger frame may trigger the transmission of the UL frame.

In an access point (AP) for receiving a frame in a WLAN according to another aspect of the present invention for achieving the object, the AP includes a radio frequency (RF) unit implemented to send and receive a radio signal and a processor operatively connected to the RF unit. The processor may be implemented to receive buffer status information from each of a plurality of stations (STAs), determine a plurality of uplink multi-user (UL MU) target STAs of the plurality of STAs and UL MU transmission opportunity (TXOP) based on the buffer status information, send an UL transmission trigger frame to each of the plurality of UL MU target STAs, and receive an UL frame on overlapped time resources included in the UL MU TXOP through UL transmission resources allocated to each of the plurality of UL MU target STAs from each of the plurality of UL MU target STAs. The buffer status information may include information about UL data pended in one of the plurality of STAs which has transmitted the buffer status information, and the UL transmission trigger frame may trigger the transmission of the UL frame.

Communication efficiency can be enhanced by receiving a plurality of frames on overlapped time resources from a plurality of STAs.

BRIEF DESCRIPTION OF THE DRAWINGS

FIG. 1 is a conceptual diagram showing the configuration of a wireless local area network (WLAN).

FIG. 8 is a conceptual diagram showing a method for transmitting buffer status information through the BA information field of a BA frame according to an embodiment of the present invention.

DESCRIPTION OF EXEMPLARY EMBODIMENTS

Figure 2:
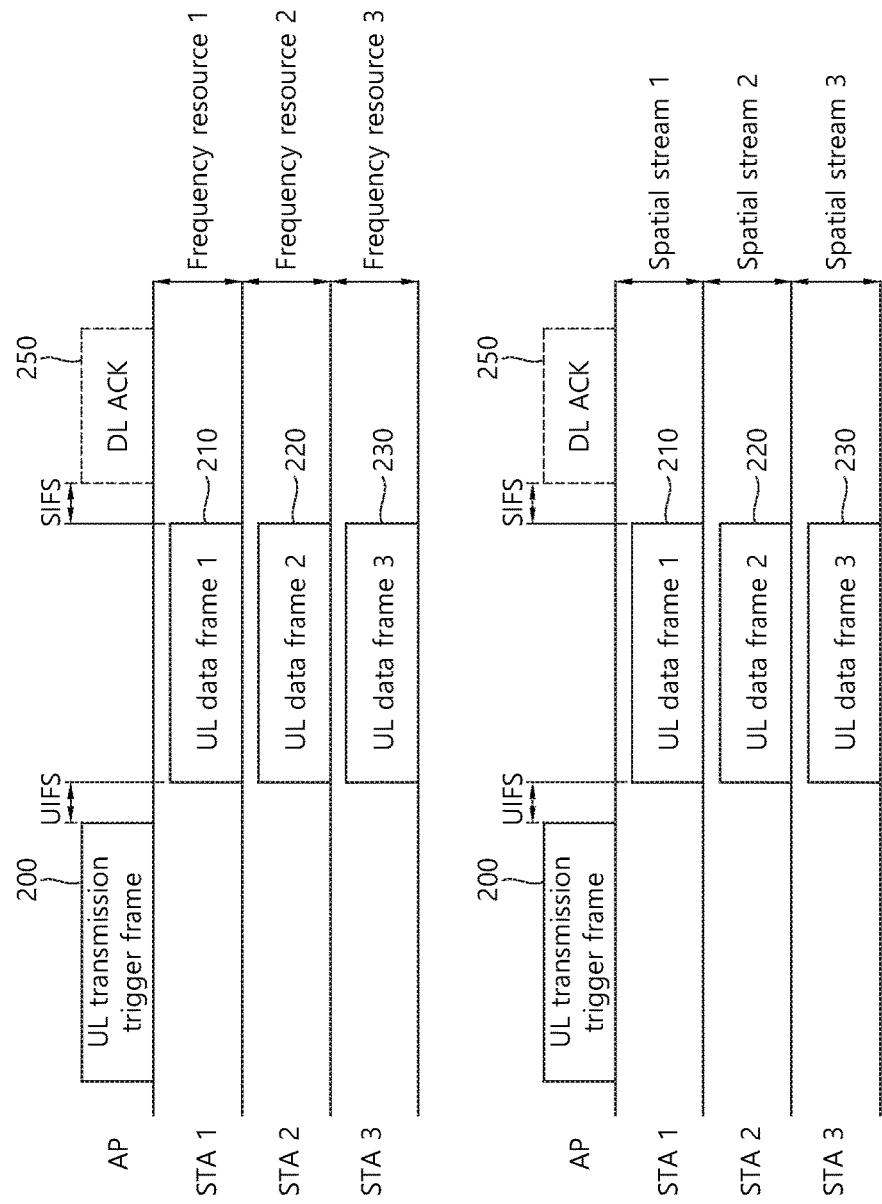
FIG. 2 is a conceptual diagram showing UL transmission based on an UL transmission trigger frame according to an embodiment of the present invention.

FIG. 1 is a conceptual diagram illustrating the configuration of a wireless local area network (WLAN).

An upper portion of FIG. 1 shows the configuration of the institute of electrical and electronic engineers (IEEE) 802.11 infrastructure network.

Referring to the upper portion of FIG. 1, the WLAN system may include one or more basic service sets (BSSs) 100 and 105. The BSS 100 or 105 is a set of an AP, such as an access point (AP) 125, and an STA, such as a station1 (STA1) 100-1, which may be successfully synchronized with each other in order to communicate with each other. The BSS 100 or 105 is not a concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a plurality of BSSs 100 and 105. The ESS 140 may be used as a term to denote one network configured of one or more APs 125 and 230 connected through the distribution system 110. The APs included in one ESS 140 may have the same service set identification (SSID).

The portal 120 may function as a bridge that performs connection of the WLAN network (IEEE 802.11) with other network (e.g., 802.X).

In the infrastructure network as shown in the upper portion of FIG. 1, a network between the APs 125 and 130 and a network between the APs 125 and 130 and the STAs 100-1, 105-1, and 105-2 may be implemented. However, a network may be established between the STAs to perform communication without the APs 125 and 130. The network established between the STAs without the APs 125 and 130 to perform communication is defined as an ad-hoc network or an independent basic service set (BSS).

A lower portion of FIG. 1 is a conceptual diagram illustrating an independent BSS.

Referring to the lower portion of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

An STA is some functional medium that includes a medium access control (MAC) that complies with the Institute of Electrical and Electronics Engineers (IEEE) 802.11 standards and that includes a physical layer interface for radio media, and the term "STA" may, in its definition, include both an AP and a non-AP station (STA).

An STA may be called various terms, such as a mobile terminal, a wireless device, a wireless transmit/receive unit (WTRU), user equipment (UE), a mobile station (MS), a mobile subscriber unit or simply a user.

An access point (AP) operating in a wireless local area network (WLAN) system may transmit data to a plurality of stations (STAs) through the same time resources. If transmission from an AP to an STA is called DL transmission, such transmission from the AP to each of the plurality of STAs may be expressed as a term called downlink multi-user transmission (DL MU transmission).

In an existing WLAN system, an AP could perform DL MU transmission based on multiple input multiple output (MU MIMO). Such transmission may be expressed as a term called DL MU MIMO transmission. In an embodiment of the present invention, an AP may perform DL MU transmission based on orthogonal frequency division multiplexing access (OFDMA). Such transmission may be expressed as a term called DL MU OFDMA transmission. If DL MU OFDMA transmission is used, an AP may transmit a DL frame to each of a plurality of STAs through each of a plurality of frequency resources on overlapped time resources.

A PPDU, a frame, and data transmitted through DL transmission may be expressed as terms called a DL PPDU, a DL frame, and DL data, respectively. The PPDU may be a data unit including a PPDU header and a physical layer service data unit (PSDU) (or a MAC protocol data unit (MPDU)). The PPDU header may include a PHY header and a PHY preamble, and the PSDU (or MPDU) may include a frame or may indicate a frame.

DL single user (SU) transmission may indicate DL transmission from an AP to one STA on all of transmission resources.

In contrast, transmission from an STA to an AP may be called UL transmission. The transmission of data from a plurality of STAs to an AP on the same time resources may be expressed as a term called uplink multi-user transmission (UL MU transmission). Unlike in existing WLAN systems, in a WLAN system according to an embodiment of the present invention, UL MU transmission may be supported. A PPDU, a frame, and data transmitted through UL transmission may be expressed as terms called an UL PPDU, an UL frame, and UL data, respectively. UL transmission by each of a plurality of STAs may be performed on a frequency domain or a spatial domain.

If UL transmission by each of a plurality of STAs is performed on a frequency domain, different frequency resources may be allocated to the plurality of STAs as UL transmission resources based on orthogonal frequency division multiplexing (OFDMA). Each of the plurality of STAs may transmit an UL frame to an AP through the allocated different frequency resource. Such a transmission method through different frequency resources may also be expressed as a term called an UL MU OFDMA transmission method.

If UL transmission by each of a plurality of STAs is performed on a spatial domain, different time space streams (or spatial streams) may be allocated to the plurality of STAs. Each of the plurality of STAs may transmit an UL frame to an AP through a different time space stream. Such a transmission method through different spatial streams may also be expressed as a term called an UL MU MIMO transmission method.

UL SU transmission may indicate DL transmission from one STA to one AP on all of transmission resources.

Hereinafter, in an embodiment of the present invention, there is disclosed a method for receiving, by a plurality of STAs, an UL transmission trigger frame (or a trigger frame) to trigger from UL transmission from an AP and transmitting, by each of the plurality of STAs, an UL frame to the AP through UL MU transmission based on the UL transmission trigger frame. Each of the plurality of STAs that has been instructed to perform UL MU transmission based on the UL transmission trigger frame may be expressed as a term called an UL MU target STA.

After the UL transmission trigger frame is transmitted by the AP, each of the UL MU target STAs may transmit the UL frame to the AP based on an UL MU transmission method before another STA other than the UL MU target STA attempts a contention for channel access. For example, in order to restrict channel access by another STA other than the UL MU target STA, the interframe space of the UL transmission trigger frame and the UL frame of the UL MU target STA may be set as a size by which channel access of another STA is not allowed. Furthermore, TXOP for UL MU transmission may be set based on the UL transmission trigger frame.

FIG. 2 is a conceptual diagram showing UL transmission based on an UL transmission trigger frame according to an embodiment of the present invention.

Referring to FIG. 2, each of a plurality of UL MU target STAs (e.g., an STA1, an STA2, and an STA3) may perform UL transmission based on an UL transmission trigger frame 200 transmitted by an AP. Each of the plurality of UL MU target STAs may receive the UL transmission trigger frame 200 from the AP and may transmit each of UL data frames 210, 220, and 230 to the AP after a specific interframe space (e.g., an uplink interframe space (ULFS)). The UL transmission by each of the plurality of UL MU STAs may be performed on overlapped time resources through each of a plurality of frequency resources or each of a plurality of time space streams.

The UL transmission trigger frame 200 may include information for the UL transmission of the plurality of UL MU target STAs. For example, the UL transmission trigger frame 200 may include at least one of information indicative of each of the plurality of UL MU target STAs performing UL transmission or a group of the plurality of UL MU target STAs, modulation and coding scheme (MCS) information to be used for the transmission of UL data by each of the plurality of UL MU target STAs, information about the size of UL data capable of being transmitted by each of the plurality of UL MU target STAs, and information about transmission opportunity (TXOP) for UL transmission. TXOP may indicate time resources for the transmission of the UL data frame.

The size of UL data transmitted by each of the plurality of UL MU target STAs and/or an MCS index for the transmission of UL data to be transmitted by each of the plurality of UL MU target STAs may be different. Accordingly, if the plurality of STAs transmits only valid (or meaningful) UL data through the UL frames, duration in which the UL frame transmitted by each of the plurality of STAs is transmitted may be different. Accordingly, zero padding may be performed to identically set pieces of transmission duration of the UL frames 210, 220, and 230 transmitted by the plurality of STAs, respectively, based on an UL MU transmission method. The AP may receive the plurality of UL frames from the plurality of UL MU target STAs based on UL MU transmission on an overlapped time, and may transmit a block ACK frame (or an ACK frame) to the plurality of UL MU target STAs as responses to the plurality of UL frames.

Alternatively, in order to increase the degree of freedom, if the plurality of STAs transmits the UL frames 210, 220, and 230 through different frequency resources based on OFDMA, transmission duration of the UL frame transmitted by each of the plurality of STAs may be differently set. In such a case, the AP may transmit a DL ACK frame to each of the plurality of STAs after a short interframe space (SIFS) by taking into consideration transmission timing of each of the plurality of UL frames.

An AP may transmit an UL transmission trigger frame by performing channel access based on an existing defined channel access method (e.g., enhanced distributed channel access (EDCA) or a distributed coordination function (DCF)) or may transmit the UL transmission trigger frame based on a newly defined channel access method.

The AP needs to collect buffer status information from a plurality of STAs within a BSS in order to determine an UL MU target STA from which an UL transmission trigger frame is to be received. The buffer status information may be information for determining an UL MU target STA of the plurality of STAs within the BSS and/or TXOP for UL MU transmission. The buffer status information may include information related to the transmission of UL data pended in an STA within the BSS. For example, the buffer status information may include queue size information, access category (AC) information, backoff count information, and MCS information. The buffer status information is described in more detail later.

The AP may determine an UL MU target STA based on the buffer status information and transmit the UL transmission trigger frame to the UL MU target STA. If the AP determines an UL MU target STA based on buffer status information, an STA that preferentially requires UL MU transmission may be first determined to be an UL MU target STA, thereby being capable of increasing WLAN transmission efficiency.

Hereinafter, an embodiment of the present invention discloses a method for collecting, by an AP, buffer status information from a plurality of STAs and determining, by the AP, an UL MU target STA based on the buffer status information collected from the plurality of STAs.

Figure 3:
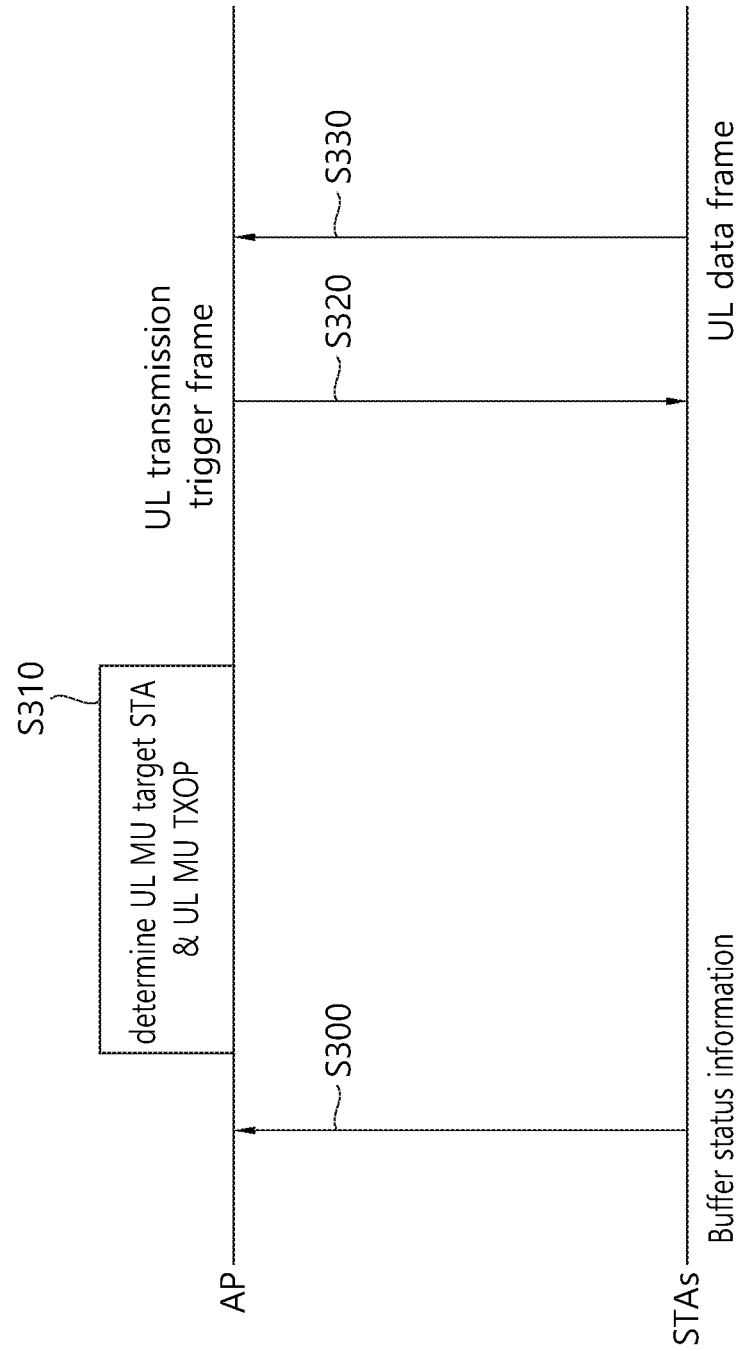
FIG. 3 is a conceptual diagram showing a method for determining, by an AP, an UL MU target STA according to an embodiment of the present invention.

FIG. 3 is a conceptual diagram showing a method for determining, by an AP, an UL MU target STA according to an embodiment of the present invention.

FIG. 3 discloses a method for determining, by an AP that has received buffer status information from a plurality of STAs, an UL MU target STA according to an embodiment of the present invention.

Referring to FIG. 3, the plurality of STAs may transmit buffer status information to the AP (step S300).

Each of the plurality of STAs may transmit the buffer status information by piggybacking it on an UL frame. More specifically, the STA may transmit the UL data frame including pended UL data through channel access of carrier sense multiple access/collision avoidance (CSMA/CA) (e.g., an EDCA or a DCF). If the STA has pended UL data to be additionally transmitted, it may transmit the UL data frame on which the buffer status information has been piggybacked to the AP.

Furthermore, in accordance with an embodiment of the present invention, buffer status information may be piggybacked on an UL control frame transmitted by an STA. The STA may transmit the buffer status information to the AP through a control frame, such as a clear to transmit frame, a block acknowledgement (BA) frame or an acknowledgement (ACK) frame. For example, the AP may transmit a DL frame to the STA based on a downlink single user (DL SU) transmission method, a DL MU transmission method, etc. The STA receives the DL frame from the AP, and may transmit an ACK frame (or a BA frame) on which the buffer status information has been piggybacked as a response to the DL frame.

Furthermore, in accordance with an embodiment of the present invention, if buffer status information may be transmitted by an STA based on a stand-alone method through a separate frame (a control frame or a null data packet (NDP) frame). For example, if an AP requests buffer status information from an STA through a polling-based procedure, the STA may transmit the buffer status information to the AP.

Furthermore, in accordance with an embodiment of the present invention, buffer status information may be transmitted through a PPDU header. The PPDU header may include the PHY header or PHY preamble of a PPDU other than a physical layer service data unit (PSDU) (or an MAC protocol data unit (MPDU)). More specifically, the buffer status information may be transmitted through the signal (SIG) field of the PPDU header. For example, the SIG field of a PPDU that carries a control frame (a CTS frame, an ACK frame, a BA frame) transmitted by a plurality of STAs based on UL MU transmission may include buffer status information. Furthermore, the SIG field of a PPDU that carries an UL data frame transmitted based on UL SU transmission or UL MU transmission may also include buffer status information.

Furthermore, in accordance with an embodiment of the present invention, TXOP for the report of buffer status information may be defined. The TXOP for the report of buffer status information may be expressed as a term called buffer status report TXOP (BRTXOP). For example, the BRTXOP may be a time resource for the report of buffer status information after a specific interframe space (e.g., an SIFS, a point coordination function (PCF) interframe space (PIFS)) after a specific DL frame (e.g., a DL management frame, a DL control frame or an NDP frame) is received. An STA may report buffer status information to an AP on BRTXOP.

Furthermore, a code division multiplexing (CDM)-based buffer status report (BR) sequence is defined. The BR sequence may be used to report the buffer status information of an STA. For example, the BR sequence may be used to deliver information corresponding to some of or the entire buffer status information.

The buffer status information may include at least one of queue size information, AC information, backoff count information, and MCS information.

The queue size information may include information about the size of data pended in an STA. More specifically, the queue size information may include information about the size (or amount) of UL data pended with respect to a specific AC. An AP may determine TXOP duration (UL MU TXOP duration) for the UL MU transmission of an UL MU target STA based on received queue size information. For example, the AP may determine UL MU TXOP duration, that is, a time resource necessary for the transmission of UL data pended in each of a plurality of UL MU target STAs, based on the queue size information of each of the plurality of UL MU target STAs.

The AC information may include information about the access category of UL data to be transmitted in uplink by an STA. An STA operating based on EDCA may classify pended data as one access category of a plurality of ACs (AC_voice (VO), AC_video (VI), AC_best effort (BE), and AC_background (BK). The queue of each of ACs for storing data pended with respect to each AC may be stored. In EDCA-based channel access, an EDCA parameter for differently setting the priority of channel access to each of the ACs of pended data may be defined. An STA may transmit an MSDU to an AP by performing channel access based on the priority of the AC of pended data. That is, the AC may be a criterion for determining the channel access priority of data transmission.

AC information transmitted by an STA as buffer status information may be used to determine an UL MU target STA by an AP. For example, the AP may preferentially determine an STA in which UL data corresponding to an AC having relatively higher priority has been pended to be an UL MU target STA.

The backoff count information may include information about the backoff count value of an STA that performs channel access in order to transmit pended UL data to an AP. If UL MU-based UL transmission is not triggered to an STA having pended UL data, the STA may perform channel access in order to transmit the pended UL data based on UL SU transmission. The STA that performs the UL SU transmission may select a backoff count for channel access as one of [0, a contention window (CW)]. The STA that has determined the backoff count for the UL SU transmission may transmit backoff count information to the AP as buffer status information.

An AP may determine an UL MU target STA based on received backoff count information. For example, if a point of time of expected channel access determined based on a specific backoff count of an STA is earlier than a point of time of the transmission of UL data based on UL MU transmission, an AP does not determine a specific STA to be an UL MU target STA, but may receive UL data from a specific STA based on UL SU transmission. In contrast, if a point of time of expected channel access determined based on a specific backoff count of an STA is equal to or later than a point of time of the transmission of UL data based on UL MU transmission, an AP may determine a specific STA to be an UL MU target STA and receive UL data from the specific STA based on UL MU transmission. For another example, if the number of STAs that may be determined by an UL MU target STA is limited, an AP may compare the sizes of the backoff count values of a plurality of STAs with each other, and may preferentially determine an STA having a relatively smaller backoff count value to be an UL MU target STA.

The MCS information may include MCS index information to be used for the transmission of pended UL data. As the value of an MCS index is relatively small, a modulation and coding scheme relatively tolerant against an error may be used. As the value of an MCS index is relatively great, a modulation and coding scheme relatively less tolerant against an error may be used. As the value of an MCS index is relatively small, data transmission efficiency may be reduced. As the value of an MCS index is relatively great, data transmission efficiency may be increased.

An AP may determine TXOP duration for the UL MU transmission of an UL MU target STA based on received MCS information. For example, an AP may determine UL MU TXOP duration, that is, a time resource necessary for the transmission of UL data pended in each of a plurality of UL MU target STAs, based on MCS index information to be used for the UL transmission of the plurality of UL MU target STAs and the aforementioned queue size information.

The AP may determine an UL MU target STA and/or UL MU TXOP based on the buffer status information received from the plurality of STAs (step S310).

For example, the AP may determine an UL MU target STA based on AC information and backoff count information. Furthermore, the AP may determine the UL MU TXOP of the UL MU target STA based on queue size information and MCS information.

The AP may determine the UL MU target STA based on the buffer status information and does not allocate UL resources to an STA in which UL data has not been pended, thereby being capable of preventing the waste of WLAN resources and enhancing efficiency of a WLAN.

The AP may transmit an UL transmission trigger frame to each of the plurality of UL MU target STAs (step S320).

The UL transmission trigger frame may include ID information about the UL MU target STA and information about the UL MU TXOP.

Each of the plurality of UL MU target STAs may receive the UL transmission trigger frame from the AP and transmit an UL data frame to the AP after a specific interframe space (step S330).

The UL transmission by each of the plurality of UL MU target STAs may be performed on overlapped time resources through each of a plurality of frequency resources or each of a plurality of time space streams.

The AP may transmit a BA frame (or an ACK frame) to the plurality of UL MU target STAs as responses to the UL data frames (step S340).

The AP may transmit the BA frame or ACK frame to each of the plurality of UL target STAs through DL MU transmission (or DL SU transmission).

In accordance with an embodiment of the present invention, an STA may negotiate an AP with respect to the capability of UL MU transmission. For example, an STA may transmit information (e.g., information related to UL MU MIMO transmission or UL MU OFDMA transmission) about the UL MU transmission capability of the STA through a probe request frame or a combination request frame transmitted for an initial access procedure with an AP. The AP may transmit information about whether UL MU transmission is supported to the STA through a probe response frame transmitted as a response to a probe request frame or a combination response frame transmitted as a response to a combination request frame.

Figure 4:
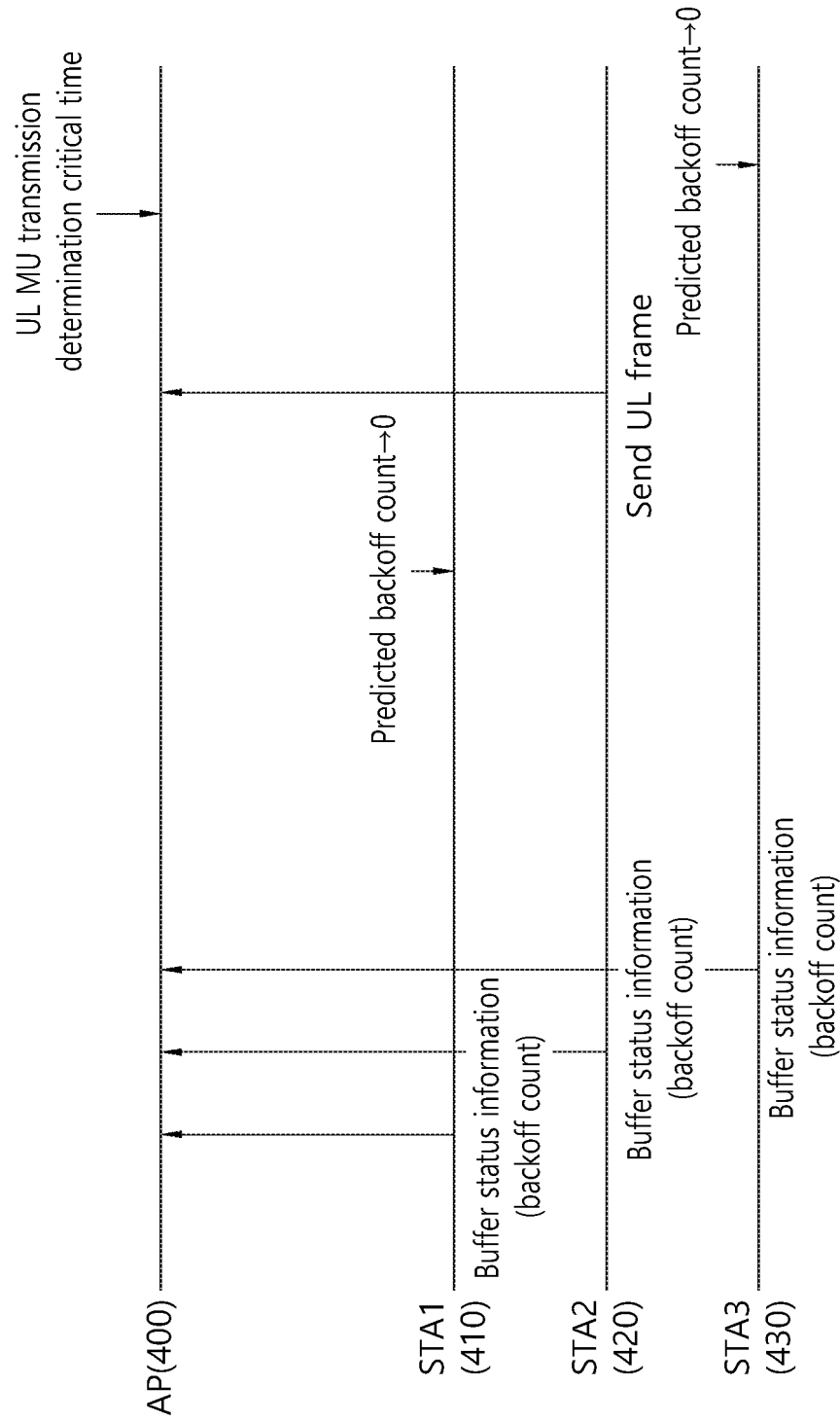
FIG. 4 is a conceptual diagram showing a method for scheduling an STA based on buffer status information in accordance with an embodiment of the present invention.

FIG. 4 is a conceptual diagram showing a method for scheduling an STA based on buffer status information in accordance with an embodiment of the present invention.

FIG. 4 discloses a method for scheduling an STA based on backoff count information included in buffer status information from the STA.

Referring to FIG. 4, an AP may receive the backoff count information of an STA and may determine a critical time (or a deadline) for determining whether the STA performs UL MU transmission. The critical time for determining whether the STA performs UL MU transmission may be expressed as a term called an UL MU transmission determination critical time. The UL MU transmission determination critical time may be determined by taking into consideration the processing time of the STA and the time taken for a frame is transmitted through the medium of the STA. The UL MU transmission determination critical time may be a predicted transmission time of an UL transmission trigger frame for triggering UL MU transmission by the AP. Alternatively, the UL MU transmission determination critical time may be the transmission time of an UL data frame triggered by an UL transmission trigger frame.

The AP may decrease the received backoff count of the STA based on the results of the sensing of the medium. For example, if the medium is sensed as being idle by the AP, the AP may decrease the backoff count of the STA. In contrast, if the medium is sensed as being busy by the AP or if the AP transmits a DL frame to the STA or the AP receives an UL frame, the AP does not decrease the backoff count of the STA, but may stop (or pend or hold) the decrement of the backoff count.

Assuming that the results of the sensing of the medium of the AP is the same as the results of the sensing of the medium of the STA, the AP may estimate the backoff count of the STA based on the results of the sensing of the medium by the AP. The predicted backoff count of the STA may be a predicted backoff count. If the predicted backoff count of the STA becomes 0 prior to an UL MU transmission determination critical time, the AP may not determine the STA to be not an UL MU target STA, but may receive an UL frame from the STA based on UL SU transmission. Alternatively, if the AP receives an UL frame from a specific STA, it may determine the specific STA to be not an UL MU target STA. Determining an STA to be not an UL MU target STA may mean that the STA is excluded from a list of UL MU target STAs and that an UL MU-based UL transmission resource is not allocated to the STA.

In FIG. 4, it has been assumed that if a predicted backoff count of an STA becomes 0 prior to an UL MU transmission determination critical time, an AP determines the STA to be not an UL MU target STA. However, if the predicted backoff count of the STA is smaller than a different setting value not 0 prior to the UL MU transmission determination critical time, the AP may determine the STA to be not an UL MU target STA.

Referring to FIG. 4, for example, if a predicted backoff count of an STA1 410 decreases to 0 prior to an UL MU transmission determination critical time, an AP 400 may determine the STA1 410 to be not an UL MU target STA. Furthermore, if an STA2 420 transmits an UL frame to the AP 400 prior to an UL MU transmission determination critical time, the AP 400 may determine the STA2 420 to be not an UL MU target STA.

Furthermore, a predicted backoff count of an STA3 430 may not decrease to 0 prior to an UL MU transmission determination critical time, and the STA3 430 may not transmit an UL frame to the AP 400 prior to an UL MU transmission determination critical time. In such a case, the AP 400 may determine the STA3 430 to be an UL MU target STA.

That is, the AP 400 may determine an UL MU target STA by taking into consideration an UL MU transmission determination critical time, a backoff count transmitted by each of the plurality of STAs, and information about whether an STA has sent an UL frame prior to an UL MU transmission determination critical time.

Figure 5:
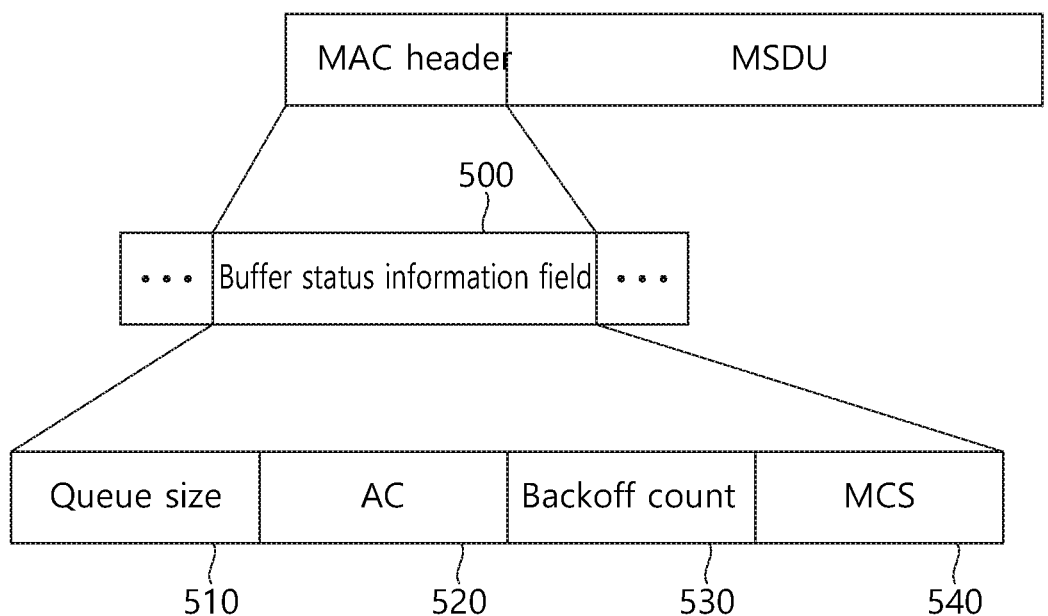
FIG. 5 is a conceptual diagram showing an UL frame including buffer status information according to an embodiment of the present invention.

FIG. 5 is a conceptual diagram showing an UL frame including buffer status information according to an embodiment of the present invention.

FIG. 5 discloses an UL frame including buffer status information, such as queue size information, AC information, backoff count information, and MCS information. An STA may transmit buffer status information by piggybacking it on an UL frame or may transmit the buffer status information through a frame defined to transmit separate buffer status information.

In FIG. 5, it is assumed that queue size information, AC information, backoff count information, and MCS information are included in an MAC header. However, buffer status information, such as queue size information, AC information, backoff count information or MCS information, may be included in any one piece of header information of a PPDU header and an MAC header. Alternatively, at least one piece of information of the buffer status information may be included in an MSDU and transmitted.

Furthermore, in FIG. 5, it is assumed that a buffer status information field 500 includes all of queue size information, AC information, backoff count information, and MCS information. However, the buffer status information field may include only at least one of queue size information, AC information, backoff count information, and MCS information. Furthermore, in FIG. 5, it is assumed that the buffer status information is transmitted through one frame, but each of pieces of information included in the buffer status information may be transmitted to an AP through a plurality of frames.

Referring to FIG. 5, the MAC header may include the buffer status information field (or a QoS control field) 500. The buffer status information field 500 may include a queue size field 510, an AC field 520, a backoff count field 530, and an MCS field 530, that is, lower fields.

The queue size field 510 may include information about the size of UL data pended in an STA. The queue size field 510 may include information about the size (or amount) of data pended with respect to a specific AC. An AP may determine TXOP duration (UL MU TXOP duration) for the UL MU transmission of an UL MU target STA based on a received queue size field 510.

The AC field 520 may include information about the AC of UL data to be transmitted in uplink by an STA. An AP may determine an UL MU target STA based on the AC field 520.

The backoff count field 530 may include information about the backoff count of an STA that performs channel access in order to transmit pended UL data to an AP. The AP may determine an UL MU target STA based on the received the backoff count field 530.

The MCS field 530 may include MCS index information to be used for the transmission of pended UL data. An AP may determine TXOP duration for the UL MU transmission of an UL MU target STA based on the MCS field 530.

Figure 6:
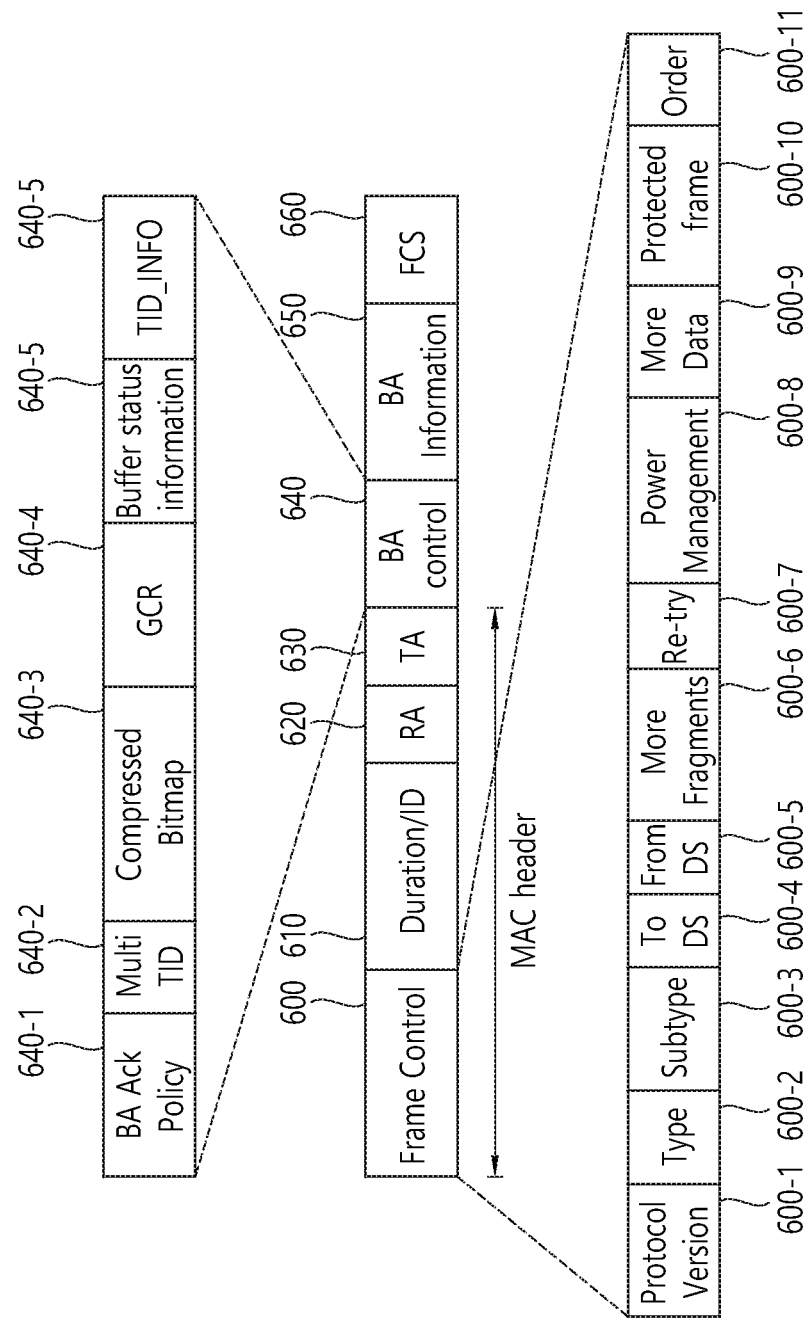
FIG. 6 is a conceptual diagram showing a block ACK frame on which buffer status information is transmitted in accordance with an embodiment of the present invention.

FIG. 6 is a conceptual diagram showing a block ACK frame on which buffer status information is transmitted in accordance with an embodiment of the present invention.

FIG. 6 discloses a method for transmitting buffer status information through a block ACK frame.

Referring to FIG. 6, the block ACK frame may include a frame control field 600, a duration/identifier (ID) field 610, a receiver address (RA) field 620, a transmitter address (TA) field 630, a BA control field 640, a BA information field 650, and a frame check sequence (FCS) 660.

The frame control field 600 may include a protocol version field 600-1, a type field 600-2, a subtype field 600-3, a To DS field 600-4, a From DS field 600-5, a MoreFragments field 600-6, a retry field 600-7, a power management field 600-8, MoreData field 600-9, a protected frame field 600-10, and an order field 600-11, that is, lower fields.

The protocol version field 600-1 may include information about the version of a protocol supported by an STA or AP.

The type field 600-2 and the subtype field 600-3 may include information for indicating whether a transmitted frame is which frame.

The To DS field 600-4 and the From DS field 600-5 may include information about the transmission and reception stages of a data frame.

The MoreFragments field 600-6 may include information about whether other fragments of a current MSDU are present or not.

The retry field 600-7 may include information about whether a frame prior to a frame that is now transmitted is transmitted again.

The power management field 600-8 may include information about power management mode of an STA.

The MoreData field 600-9 may include information about UL data pended for UL MU transmission. For example, if a value of the MoreData field 600-9 is 1, the MoreData field 600-9 may indicate that pended UL data capable for UL MU transmission (or UL MU transmission capable) is present in an STA. If a value of the MoreData field 600-9 is 0, the MoreData field 600-9 may indicate that pended UL data capable for UL MU transmission (or UL MU transmission capable) is not present in the STA. In accordance with an embodiment of the present invention, an AP may determine whether pended UL data for UL MU transmission (UL MU transmission capable) is present or not based on the MoreData field 600-9 included in block ACK transmitted by an STA. Furthermore, if a value of the MoreData field 600-9 is 1, the MoreData field 600-9 may indicate that buffer status information is included in the BA frame.

The protected frame field 600-10 may include information about whether information included in a frame body is protected information.

The order field 600-11 may include information indicating whether an MSDU is present in the frame.

The duration/ID field 610 may include information about TXOP duration for the transmission of the frame.

The RA field 620 may include information about the address of an AP (or STA) that receives the frame.

The TA field 630 may include information about the address of an STA (or an AP) that transmits the frame.

The BA control field 640 may include a BA ACK policy field 640-1, a multi traffic identifier (TID) field 640-2, a compressed bitmap field 640-3, a GCR field 640-4, a buffer status information field 640-5, and a TID_INFO field 640-5, that is, lower fields.

The BA ACK policy field 640-1 may include information about a block ACK policy. The block ACK policy may be determined depending on whether a transmission stage requests an immediate ACK response.

The multi traffic identifier (TID) field 640-2, the compressed bitmap field 640-3, and the groupcast with retries (GCR) field 640-4 may include information about the type of block ACK frame.

The buffer status information field 640-5 may be an existing reserved field. The buffer status information field may include buffer status information according to an embodiment of the present invention. For example, if a value of a More Data field included in a block ACK frame transmitted by an STA capable of the aforementioned UL MU transmission (an uplink multi-user transmission capable STA) is 1, a reserved field included in a BA frame may be used as the buffer status information field 640-5. That is, the STA may transmit buffer status information by piggybacking it on the block ACK frame based on the buffer status information field 640-5.

The TID_INFO field 640-5 may include information about a TID corresponding to the block ACK frame.

The BA information field 650 may include information indicative of an MSDU corresponding to the block ACK frame. In accordance with an embodiment of the present invention, the BA information field 650 may also include the buffer status information. That is, the buffer status information may be included in the buffer status information field 640-5 and/or the BA information field 650 included in the aforementioned the BA control field 640 and transmitted.

The FCS field 660 may include information for checking an error of the frame.

Figure 7:
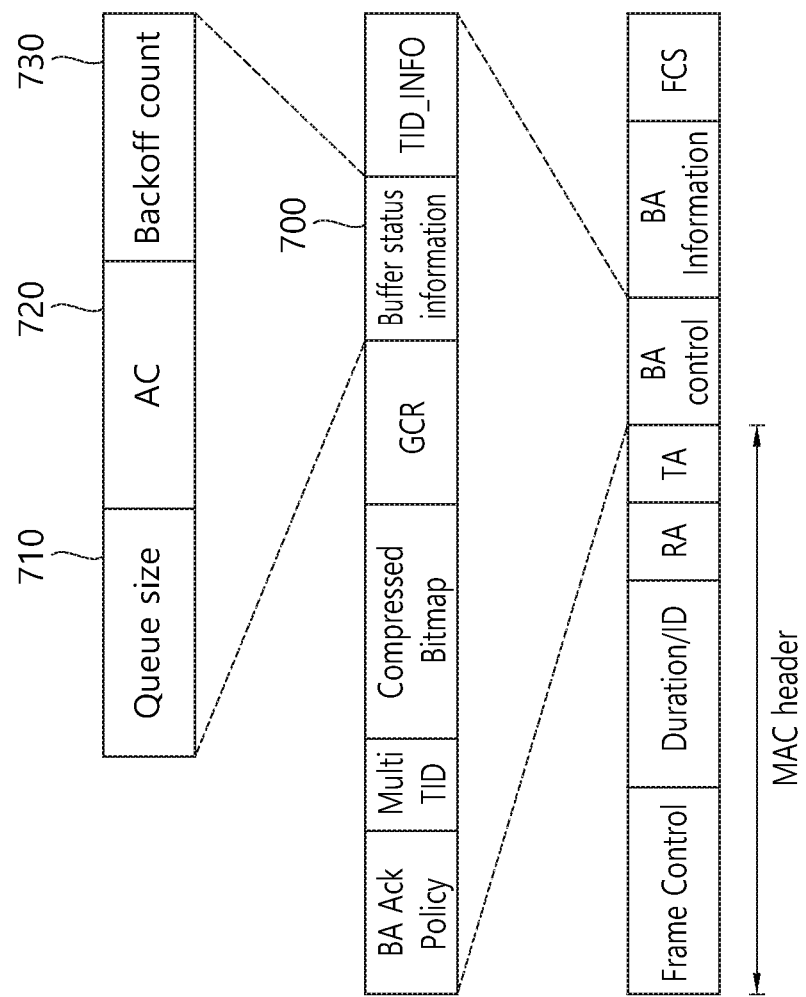
FIG. 7 is a conceptual diagram showing a method for transmitting buffer status information through the BA control field of a BA frame according to an embodiment of the present invention.

FIGS. 7 and 8 disclose a case where buffer status information is included in a BA control field or a BA information field in more detail.

FIG. 7 is a conceptual diagram showing a method for transmitting buffer status information through the BA control field of a BA frame according to an embodiment of the present invention.

FIG. 7 discloses a method for transmitting buffer status information through the BA control field 700 of a BA frame according to an embodiment of the present invention.

Referring to FIG. 7, the buffer status information field 700 may include a queue size field 710, an AC field 720, and a backoff count field 730.

The queue size field 710 may include information about a total size of an MSDU or aggregate (A)-MSDU buffered (or pended) in a delivery queue. The size of the MSDU or A-MSDU buffered in the delivery queue may be expressed as a 256 octet unit. Information about the size of the MSDU or A-MSDU buffered in the delivery queue may be expressed as the closest multiple of 256 octets and may be included in the queue size field 710. The queue size field 710 may have a size of 4-5 bits.

The AC field 720 may include information about the access category of UL data buffered in a delivery queue. More specifically, the AC field 720 may include information about whether the access category of UL data buffered in a delivery queue is AC_BE, AC_BK, AC_VI or AC_VO. The AC field 720 may have a size of 2 bits. The AC field 720 may indicate AC_BE if the AC field 720 is 00. The AC field 720 may indicate AC_BK if the AC field 720 is 01. The AC field 720 may indicate AC_VI if the AC field 720 is 10. The AC field 720 may indicate AC_VO if the AC field 720 is 11.

The backoff count field 730 may include information about a backoff count for the transmission of an UL frame by an STA. If the backoff count field 730 is 1 bit, 0 may indicate a backoff count value between 0 to 15, and 1 may indicate a backoff count value greater than 15. If the backoff count field 730 is 2 bits, 00 may indicate a backoff count value between 0 to 7, 01 may indicate a backoff count value between 8 to 15, 10 may indicate a backoff count value between 16 to 31, and 11 may indicate a backoff count value of 31.

FIG. 8 is a conceptual diagram showing a method for transmitting buffer status information through the BA information field of a BA frame according to an embodiment of the present invention.

FIG. 8 discloses a method for transmitting buffer status information based on a BA information field.

Referring to FIG. 8, an explicit method or an implicit method may be used to transmit buffer status information based on the BA information field.

Referring to the upper portion of FIG. 8, if the explicit method is used, a buffer status information indicator 800 may be defined in the BA information field. The buffer status information indicator 800 may indicate whether buffer status information is included in the BA information field. For example, if a bit value of the buffer status information indicator 800 of 1 bit is 1, it may indicate that the buffer status information is included in the BA information field 840. In contrast, if a bit value of the buffer status information indicator 800 of 1 bit is 0, it may indicate that the buffer status information is not included in the BA information field 840. The buffer status information indicator 800 may be defined based on a bit of a reserved field included in the BA information field. In such a case, the reserved field included in the BA information control field may decrease from 8 bits to 7 bits.

Referring to the lower portion of FIG. 8, if the implicit method is used, a value 1 of the More Data field 850 of the frame control field of a block ACK frame may indicate that buffer status information is included in the BA information field 840.

Referring to the upper and lower portions of FIG. 8, the BA information field 840 may include a buffer status information field 845. The buffer status information field 845 may include a queue size field 810, an AC field 820, and a backoff count field 830.

The queue size field 810 may include information about a total size of an MSDU and aggregate (A)-MSDU buffered (or pended) in a delivery queue.

The AC field 820 may include information about the access category of UL data buffered in the delivery queue.

The backoff count field 830 may include information about a backoff count for the transmission of an UL frame by an STA.

Figure 9:
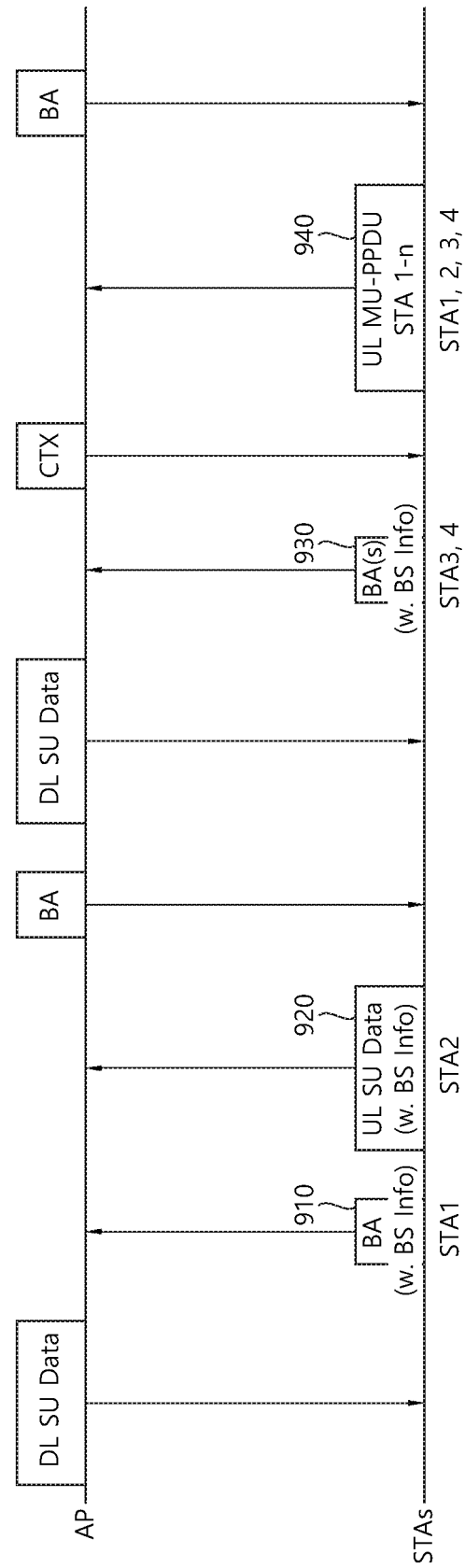
FIG. 9 is a conceptual diagram showing a procedure for collecting buffer status information and UL MU transmission according to an embodiment of the present invention.

FIG. 9 is a conceptual diagram showing a procedure for collecting buffer status information and UL MU transmission according to an embodiment of the present invention.

FIG. 9 discloses a method for collecting, by an AP, buffer status information based on buffer status information transmitted in a piggyback manner and triggering, by the AP, UL MU transmission based on the collected buffer status information.

Referring to FIG. 9, an STA1 may receive a DL frame 900, transmitted based on DL SU transmission, from an AP and may transmit a BA frame 910 as a response to the DL frame 900. The STA1 may transmit buffer status information by piggybacking it on the BA frame 910.

An STA2 may transmit an UL frame 920 based on UL SU transmission by performing channel access. When transmitting the UL frame 920 to the AP, the STA2 may transmit buffer status information by piggybacking it on the UL frame 920.

An STA3 and an STA4 may receive a data frame based on DL MU transmission from the AP and transmit BA frames 930 to the AP as a response to the data frame. The buffer status information of each of the STA3 and the STA4 may be piggybacked on the BA frame 930 transmitted by each of the STA3 and the STA4 and then transmitted.

The AP may trigger the UL MU transmission based on the buffer status information received from each of the STA1, the STA2, the STA3, and the STA4. As described above, the AP may determine an UL MU target STA based on the buffer status information received from the STAs. If the STA1, the STA2, the STA3, and the STA4 are determined to be UL MU target STAs, the AP may trigger the UL MU transmission of the STA1, the STA2, the STA3, and the STA4 by transmitting an UL transmission trigger frame to the STA1, the STA2, the STA3, and the STA4.

The AP may receive an UL frame 940 through the UL MU transmission from each of the STA1, the STA2, the STA3, and the STA4, and may transmit a BA frame for the UL frame 940 to each of the STA1, the STA2, the STA3, and the STA4.

Figure 10:
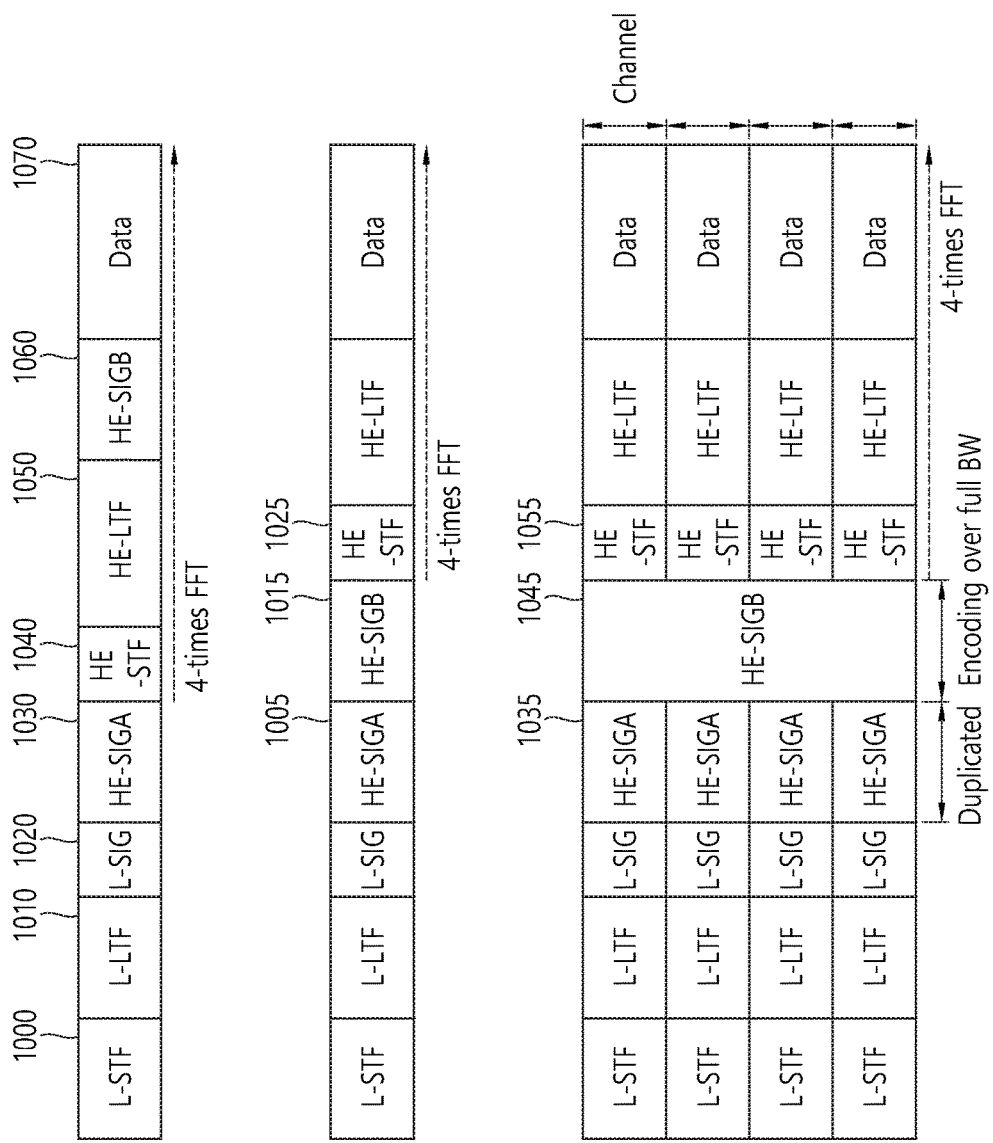
FIG. 10 is a conceptual diagram showing a PPDU format for the transmission of a frame according to an embodiment of the present invention.

FIG. 10 is a conceptual diagram showing a PPDU format for the transmission of a frame according to an embodiment of the present invention.

FIG. 10 discloses a PPDU format according to an embodiment of the present invention. The aforementioned UL transmission trigger frame, UL frame (UL data frame, UL control frame), block ACK frame, and DL frame may be carried based on the PPDU format of FIG. 10.

Referring to the upper portion of FIG. 10, the PHY header of a DL PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LFT), and a high efficiency-signal-B (HE-SIG B). The PHY header to the L-SIG may be divided into a legacy part and a high efficiency part (HE part) after the L-SIG.

The L-STF 1000 may include a short training orthogonal frequency division multiplexing (OFDM) symbol. The L-STF 1000 may be used for frame detection, automatic gain control (AGC), diversity detection, and coarse frequency/time synchronization.

The L-LTF 1010 may include a long training orthogonal frequency division multiplexing (OFDM) symbol. The L-LTF 1010 may be used for fine frequency/time synchronization and channel estimation.

The L-SIG 1020 may be used to transmit control information. The L-SIG 1020 may include information about a data transfer rate and a data length.

The HE-SIG A 1030 may include information for indicating an STA (or an AP) that will received the PPDU. For example, the HE-SIG A 1030 may include the ID of a specific STA that will receive the PPDU and information for indicating a group of a specific STA. Furthermore, the HE-SIG A 1030 may also include resource allocation information for an STA if the PPDU is transmitted based on OFDMA or MIMO.

Furthermore, the HE-SIG A 1030 may also include color bit information for BSS ID information, bandwidth information, a tail bit, a CRC bit, modulation and coding scheme (MCS) information for the HE-SIG B 1060, symbol number information for the HE-SIG B 1060, and cyclic prefix (CP) (or guard interval (GI)) length information.

Furthermore, as described above, the HE-SIG A 1030 may also include buffer status information (e.g., at least one of queue size information, AC information, backoff count information and MCS information).

The HE-STF 1040 may be used to enhance automatic gain control estimation in a multiple input multiple output (MIMO) environment or OFDMA environment.

The HE-LFT 1050 may be used to estimate a channel in an MIMO environment or OFDMA environment.

The HE-SIG B 1060 may include the length of a physical layer service data unit (PSDU) for each STA, information about an MCS, and a tail bit. Furthermore, the HE-SIG B 1060 may also include information about an STA that will receive the PPDU and OFDMA-based resources allocation information (or MU-MIMO information). If OFDMA-based resource allocation information (or MU-MIMO-related information) is included in the HE-SIG B 1060, the corresponding information may not be included in the HE-SIG A 1130.

The size of IFFT applied to the HE-STF 1040 and fields after the HE-STF 1040 and the size of IFFT applied to the fields prior to the HE-STF 1040 may be different. For example, the size of IFFT applied to the HE-STF 1040 and fields after the HE-STF 1040 may be four times greater than the size of IFFT applied to fields before the HE-STF 1040. An STA may receive the HE-SIG A 1030, and may receive an instruction for the reception of a DL PPDU based on the HE-SIG A 1030. In such a case, the STA may perform decoding based on the size of FFT changed from the HE-STF 1040 and the fields after the HE-STF 1040. In contrast, if the STA does not receive an instruction for the reception of a DL PPDU based on the HE-SIG A 1030, it may stop decoding and set a network allocation vector (NAV). The cyclic prefix (CP) of the HE-STF 1040 may have a size greater than that of another field. During such a CP period, the STA may change the size of FFT and perform decoding on the DL PPDU.

The sequence of the fields forming the PPDU format disclosed in the upper portion of FIG. 10 may be changed. For example, as disclosed in the middle portion of FIG. 10, the HE-SIG B 1015 of the HE part may be placed right after the HE-SIG A 1005. An STA may perform decoding on a part up to the HE-SIG A 1005 and the HE-SIG B 1015, may receive required control information, and may set an NAV. Likewise, the size of IFFT applied to the HE-STF 1025 and fields after the HE-STF 1025 may be different from the size of IFFT applied to the fields prior to the HE-STF 1025.

An STA may receive the HE-SIG A 1005 and the HE-SIG B 1015. If the reception of the PPDU is instructed based on the HE-SIG A 1005, the STA may change the size of FFT from the HE-STF 1025 and perform decoding on the PPDU. In contrast, the STA receives the HE-SIG A 1005. If the reception of the DL PPDU is not instructed based on the HE-SIG A 1005, the STA may set a network allocation vector (NAV).

Referring to the lower portion of FIG. 10, there is disclosed a PPDU format for downlink (DL) multi-user (MU) transmission. The PPDU may be transmitted to an STA through different transmission resources (frequency resources or spatial streams). On the PPDU, fields prior to an HE-SIG B 1045 may be transmitted in different transmission resources in a duplicated form. The HE-SIG B 1045 may be transmitted on an encoded form on all of transmission resources. Alternatively, the HE-SIG B 1045 may be encoded in the same unit (e.g., 20 MHz) as the legacy part and may duplicated in a 20 MHz unit on all of transmission resources and transmitted. The HE-SIG B 1045 may be encoded in the same unit (e.g., 20 MHz) as the legacy part, but the HE-SIG B 1045 transmitted through each of a plurality of 20 MHz units included in all of transmission resources may include different information.

Fields after the HE-SIG B 1045 may include individual information for each of a plurality of STAs that receives the PPDU.

If the fields included in the PPDU are transmitted through respective transmission resources, CRC for each of the fields may be included in the PPDU. In contrast, if a specific field included in the PPDU is encoded on all of transmission resources and transmitted, CRC for each of the fields may not be included in the PPDU. Accordingly, overhead for CRC can be reduced.

Likewise, in a PPDU format for DL MU transmission, an HE-STF 1055 and fields after the HE-STF 1055 may be encoded based on the size of IFFT different from that of the fields prior to the HE-STF 1055. Accordingly, if an STA receives the HE-SIG A 1035 and the HE-SIG B 1045 and receives an instruction for the reception of the PPDU based on the HE-SIG A 1035, it may change the size of FFT from the HE-STF 1055 and perform decoding on the PPDU.

Figure 11:
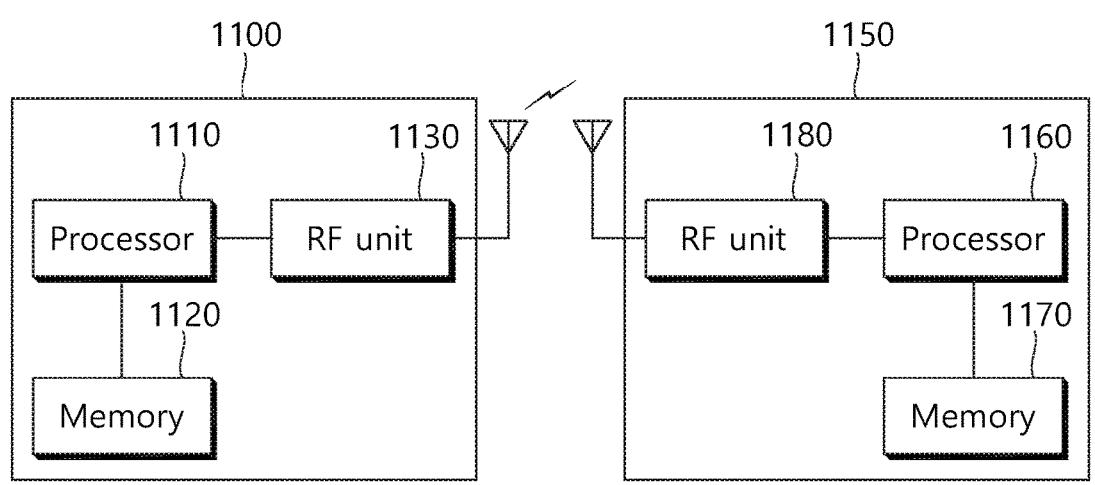
FIG. 11 is a block diagram showing a wireless device to which an embodiment of the present invention may be applied.

FIG. 11 is a block diagram showing a wireless device to which an embodiment of the present invention may be applied.

Referring to FIG. 11, the wireless apparatus 1100 is an STA capable of implementing the aforementioned embodiments and may be an AP 1100 or a non-AP station (or STA) 1150.

The AP 1100 includes a processor 1110, memory 1120, and a radio frequency (RF) unit 1130.

The RF unit 1130 is connected to the processor 1110 and may transmit/receive a radio signal.

The processor 1110 may implement the functions, processes and/or methods proposed by the present invention. For example, the processor 1110 may be implemented to perform the operations of the AP according to the aforementioned embodiments of the present invention. The processor may perform the operations of the AP disclosed in the embodiments of FIGS. 1 to 10.

For example, the processor 1110 may receive buffer status information from each of a plurality of stations (STAs), and may determine a plurality of uplink multi-user (UL MU) target STAs of the plurality of STAs and UL MU transmission opportunity (TXOP) based on the buffer status information. Furthermore, the processor may be implemented to transmit an UL transmission trigger frame to each of a plurality of UL MU target STAs and to receive an UL frame on overlapped time resources, included in UL MU TXOP through UL transmission resources allocated to each of the plurality of UL MU target STAs, from each of the plurality of UL MU target STAs. The buffer status information may include information about UL data pended in one of a plurality of STAs that has transmitted the buffer status information, and the UL transmission trigger frame may trigger the transmission of the UL frame.

The STA 1150 includes a processor 1160, memory 1170, and a radio frequency (RF) unit 1180.

The RF unit 1180 is connected to the processor 1160 and may transmit/receive a radio signal.

The processor 1160 may implement the functions, processes and/or methods proposed by the present invention. For example, the processor 1160 may be implemented to perform the operations of the STA according to the aforementioned embodiments of the present invention. The processor may perform the operations of the STA disclosed in the embodiments of FIGS. 1 to 10.

For example, the processor 1160 may be implemented to transmit buffer status information to an AP by piggybacking it on an UL frame, such as an UL data frame or a block ACK frame.

Furthermore, the processor 1160 may transmit the buffer status information to the AP through a separate frame (a control frame or a null data packet (NDP) frame) using a stand-alone method. If an AP requests the STA from the buffer status information through a polling-based procedure, the STA may be implemented to transmit the buffer status information to the AP.

The processor 1110, 1160 may include application-specific integrated circuits (ASICs), other chipsets, logic circuits, data processors and/or converters for mutually converting baseband signals and radio signals. The memory 1120, 1170 may include read-only memory (ROM), random access memory (RAM), flash memory, memory cards, storage media and/or other storage devices. The RF unit 1130, 1180 may include one or more antennas for transmitting and/or receiving a radio signal.

When an embodiment is implemented in software, the aforementioned scheme may be implemented in the form of a module (process or function) for performing the aforementioned function. The module may be stored in the memory 1120, 1170 and executed by the processor 1110, 1160. The memory 1120, 1170 may be placed inside or outside the processor 1110, 1160 and may be connected to the processor 1110, 1160 by various well-known means.

What is claimed is:

1. A method for a wireless local area network (WLAN), the method performed by an access point (AP) and comprising:

receiving a probe request frame from a reporting station (STA), the probe request frame including a capability field related to uplink multi-user (UL MU) transmission;

transmitting a probe response frame including a response related to the capability field to the reporting STA;

receiving buffer status information from the reporting STA, the buffer status information including queue size information for buffered traffic at the reporting STA and an access category (AC) for the buffered traffic;

allocating UL frequency resources for a plurality of UL MU target STAs including the reporting STA based on the buffer status information, the plurality of UL MU target STAs participating in the UL MU transmission;

transmitting a trigger frame initiating the UL MU transmission, the trigger frame including time duration information for the UL MU transmission, modulation and coding scheme (MCS) information for the plurality of UL MU target STAs, and identification information for the plurality of UL MU target STAs; and receiving UL frames based on the UL MU transmission from the plurality of UL MU target STAs.

2. The method of claim 1, wherein the buffer status information further indicates at least a first AC for voice traffic, a second AC for video traffic, a third AC for best effort traffic or a fourth AC for background traffic.

3. The method of claim 1, wherein the buffer status information further includes an amount of the buffered traffic.

4. An access point (AP) in a wireless local area network (WLAN), the AP comprising:

a radio frequency (RF) unit configured to send and receive a radio signal; and a processor operatively connected to the RF unit and configured to:

control the RF unit to receive a probe request frame from a reporting station (STA), the probe request frame including a capability field related to uplink multi-user (UL MU) transmission;

control the RF unit to transmit a probe response frame including a response related to the capability field to the reporting STA;

control the RF unit to receive buffer status information from the reporting STA, the buffer status information including queue size information for buffered traffic at the reporting STA and an access category (AC) for the buffered traffic;

allocate UL frequency resources for a plurality of UL MU target STAs including the reporting STA based on the buffer status information, the plurality of UL MU target STAs participating in the UL MU transmission;

control the RF unit to transmit a trigger frame initiating the UL MU transmission, the trigger frame including time duration information for the UL MU transmission, modulation and coding scheme (MCS) information for the plurality of UL MU target STAs, and identification information for the plurality of UL MU target STAs; and control the RF unit to receive UL frames based on the UL MU transmission from the plurality of UL MU target STAs.

5. The AP of claim 4, wherein the buffer status information further indicates at least a first AC for voice traffic, a second AC for video traffic, a third AC for best effort traffic or a fourth AC for background traffic.

6. The AP of claim 4, wherein the buffer status information further includes an amount of the buffered traffic.

\* \* \* \* \*